United States Patent [19]

Drostholm et al.

[11] 4,035,128
[45] July 12, 1977

[54] BRICK PRESS AND ASSOCIATED EQUIPMENT FOR MAKING BRICKS

[75] Inventors: Frede Hilmar Drostholm, Vedbaek; Harry Jensen, Gentofte; Per Willadsen, Melby, all of Denmark

[73] Assignee: Frede Hilmar Drostholm, Vedbaek, Denmark

[21] Appl. No.: 510,145

[22] Filed: Sept. 30, 1974

[51] Int. Cl.² ............... B28B 3/06; B30B 11/10; B28B 5/08; B28B 13/02
[52] U.S. Cl. ............................. 425/259; 425/345; 425/444
[58] Field of Search .......... 425/261, 352, 359, 356, 425/444, 453, 258, 259, 260, 344, 345, 448, 216, 404, 405, 445, 446, 436, 406, 412, 415, 422, 436, 455; 264/333, 336, 157

[56] References Cited

U.S. PATENT DOCUMENTS

| 374,938 | 12/1887 | Carman | 425/344 |
| 1,738,046 | 12/1929 | Elton et al. | 425/444 |
| 3,671,165 | 6/1972 | Schwellenbach | 425/455 |
| 3,677,673 | 7/1972 | Shapiro | 425/261 |

FOREIGN PATENT DOCUMENTS 1,183,354   3/1970   United Kingdom

Primary Examiner—J. Howard Flint, Jr.
Attorney, Agent, or Firm—Synnestvedt & Lechner

[57] ABSTRACT

A brick press is disclosed having a turntable carrying a plurality of molds angularly spaced from each other and having equipment associated therewith establishing a plurality of series of operating stations, each series including at least a precompression station, a compression station and an ejection station. A material handling and feed system is also disclosed, providing for preparation of particulate or granular materials to be charged into the molds.

23 Claims, 33 Drawing Figures

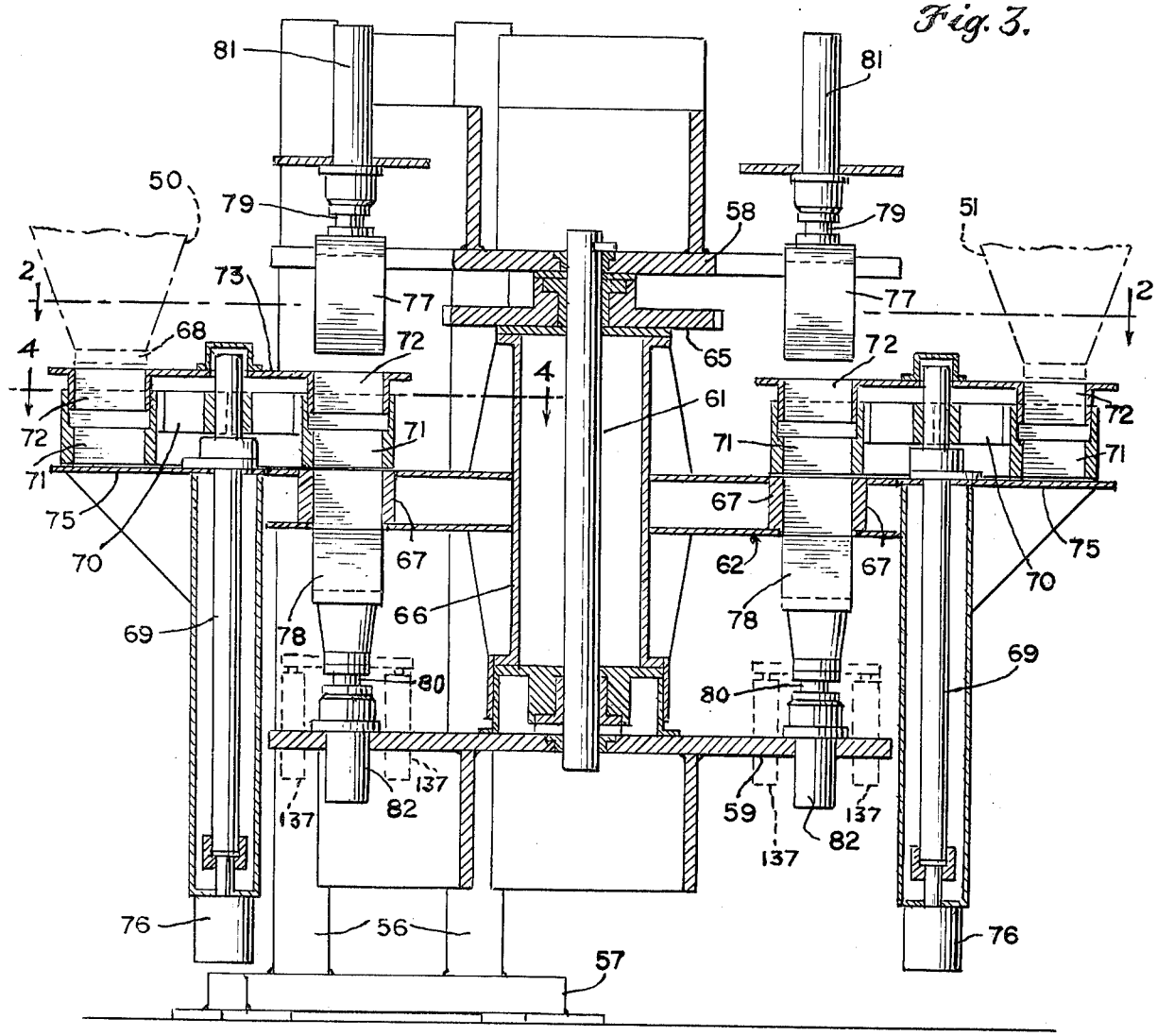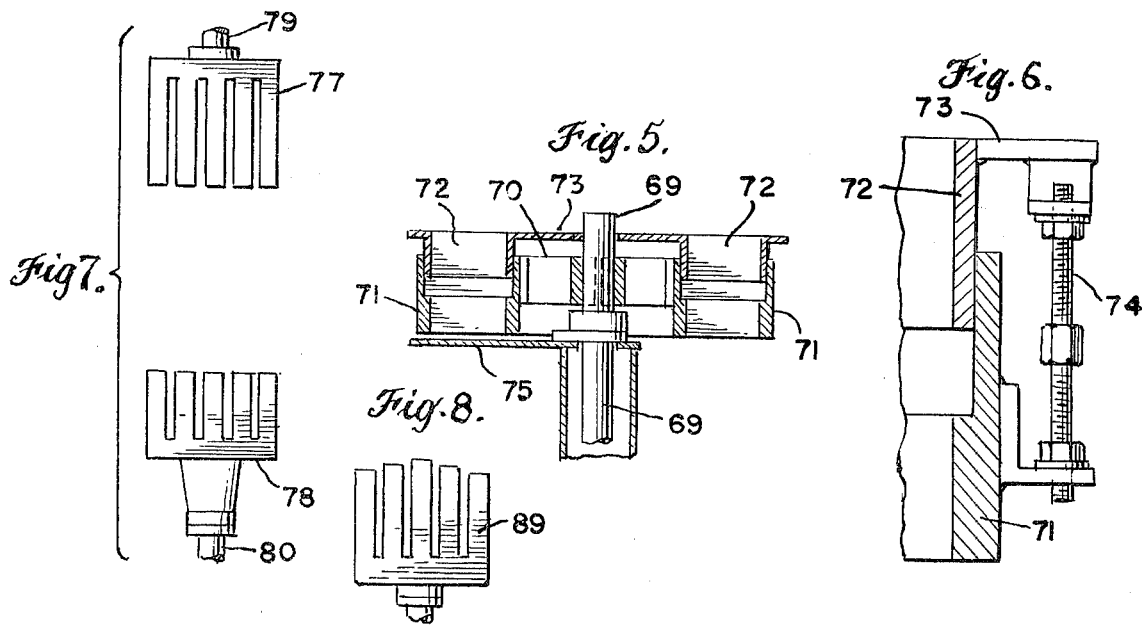

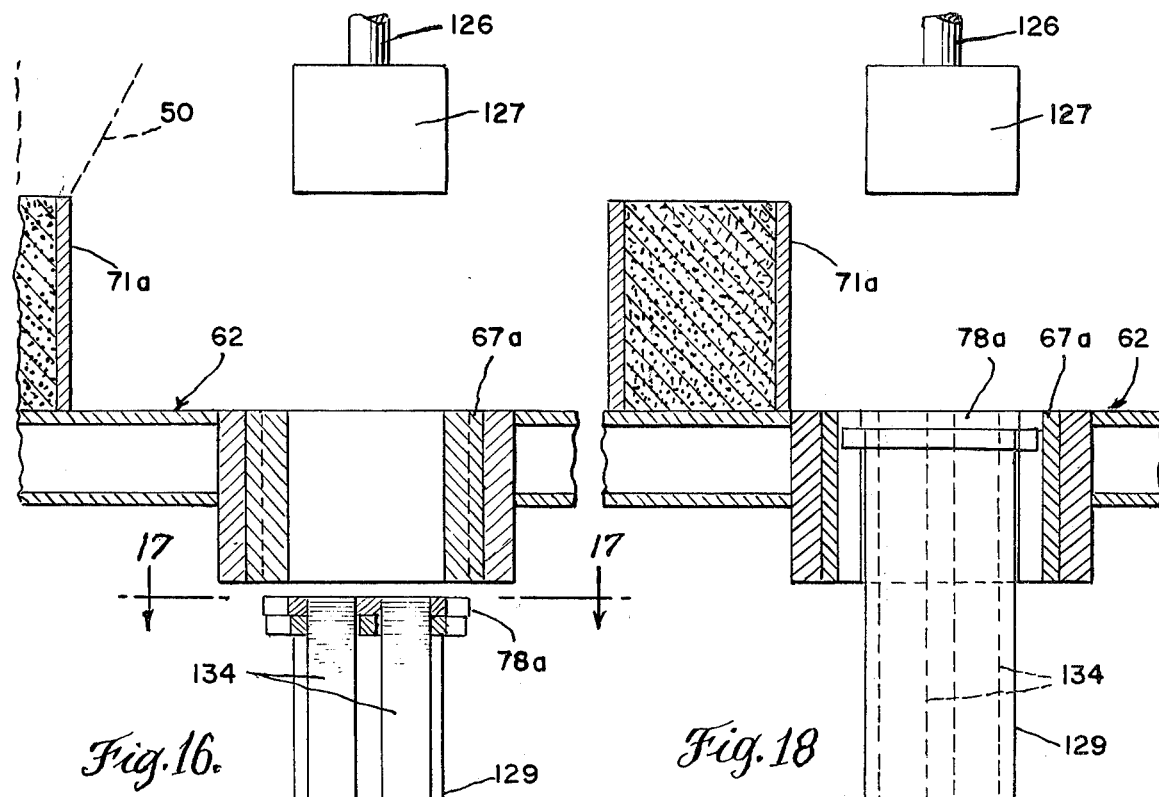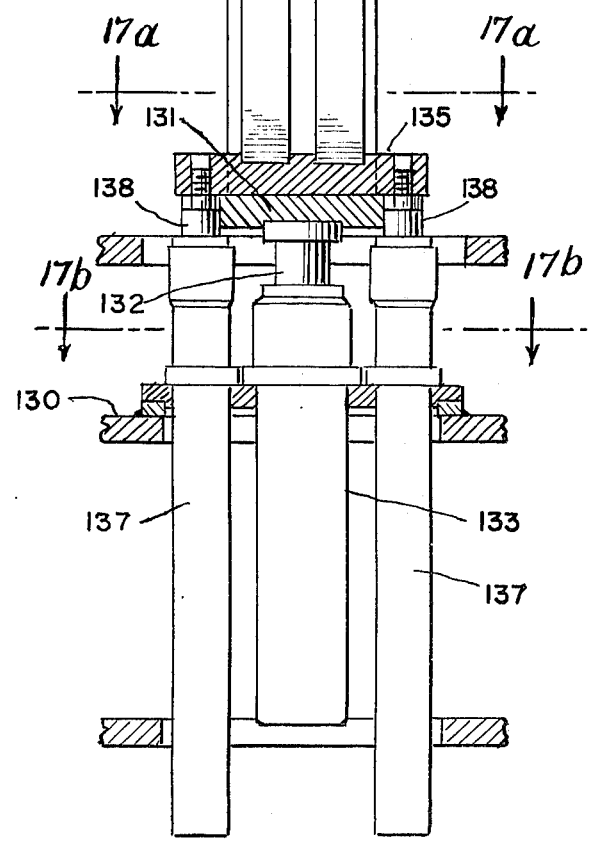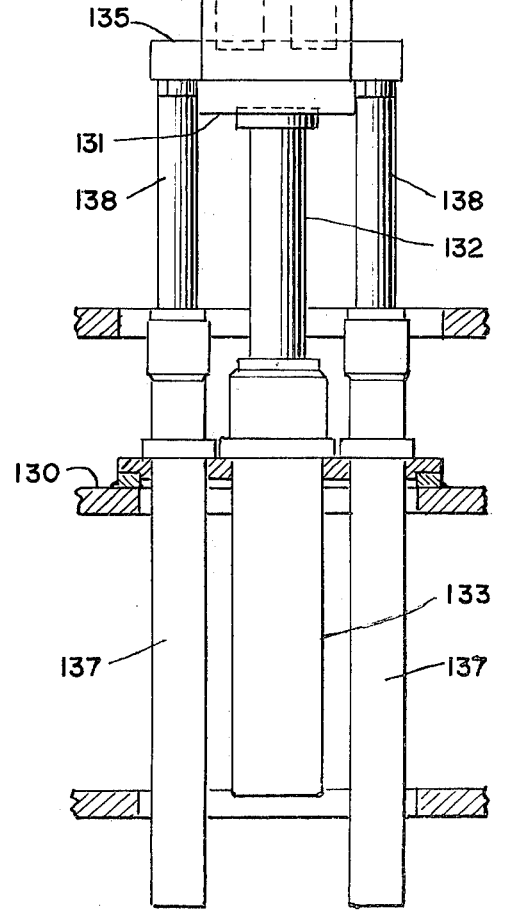

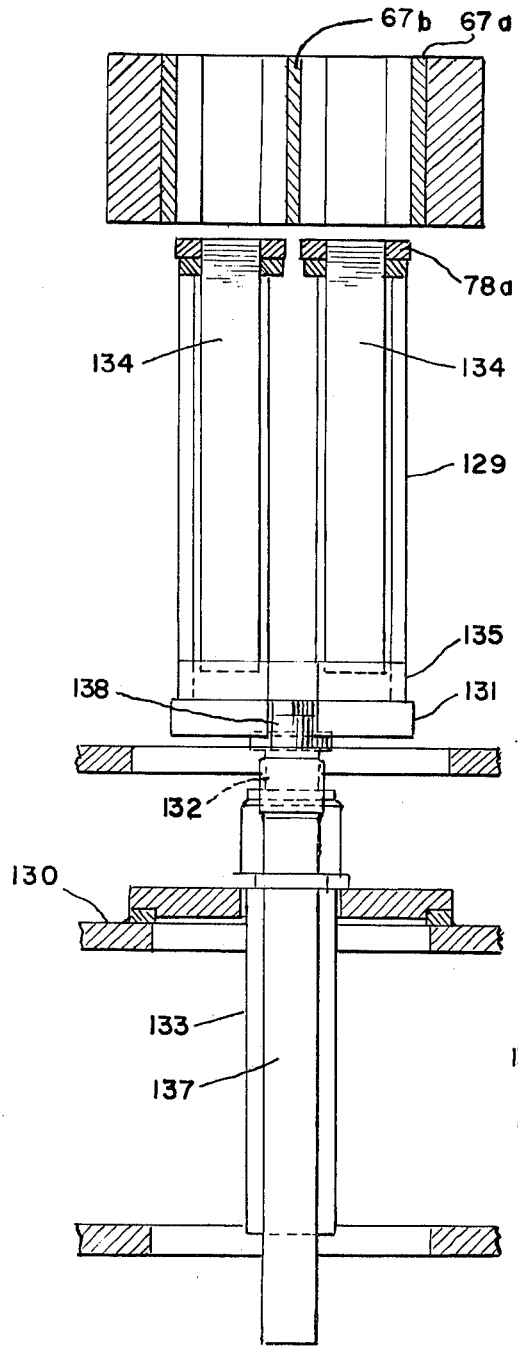
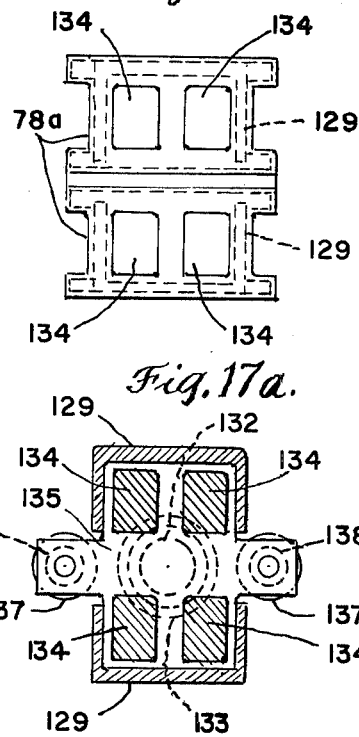
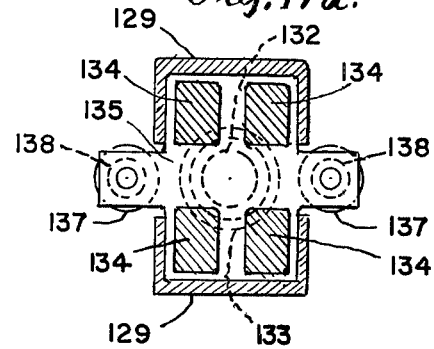
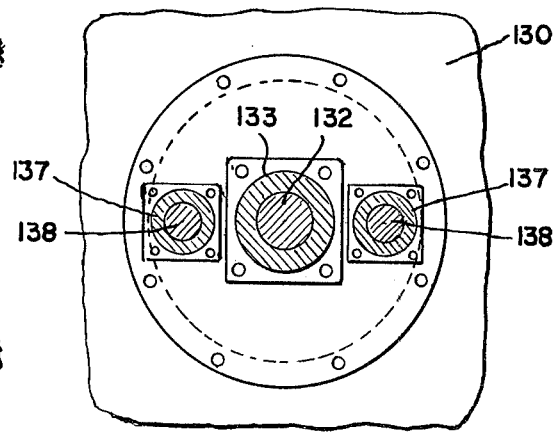

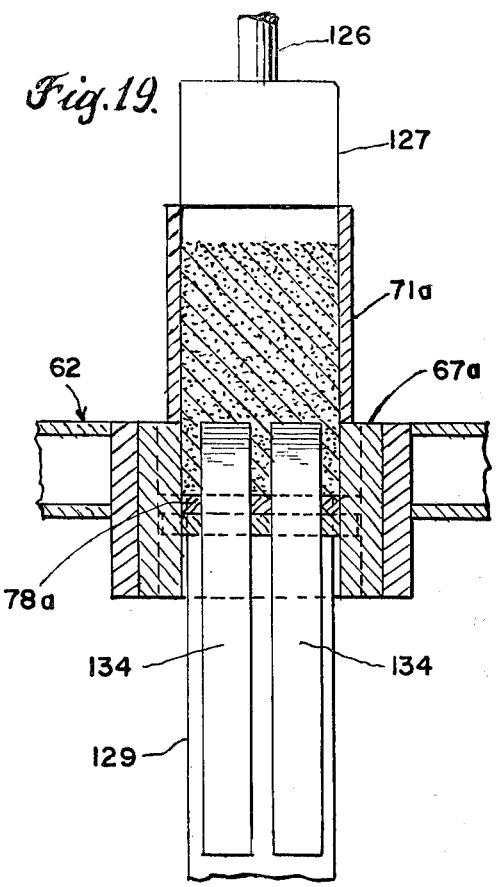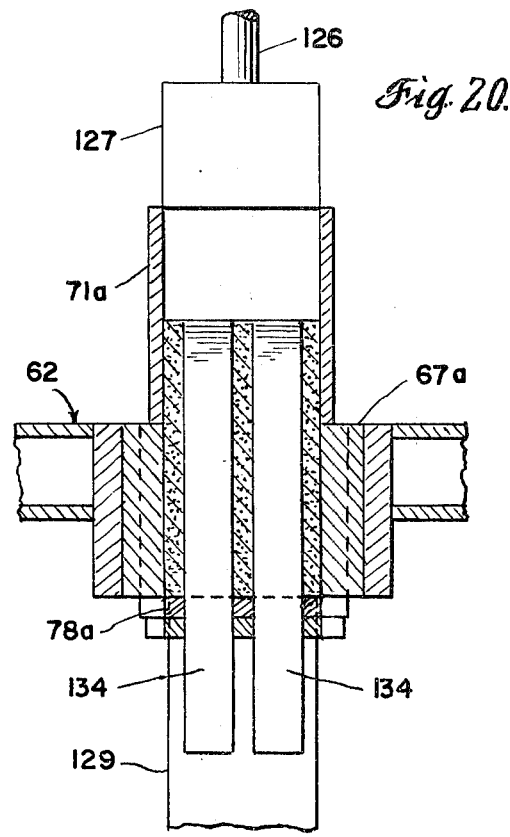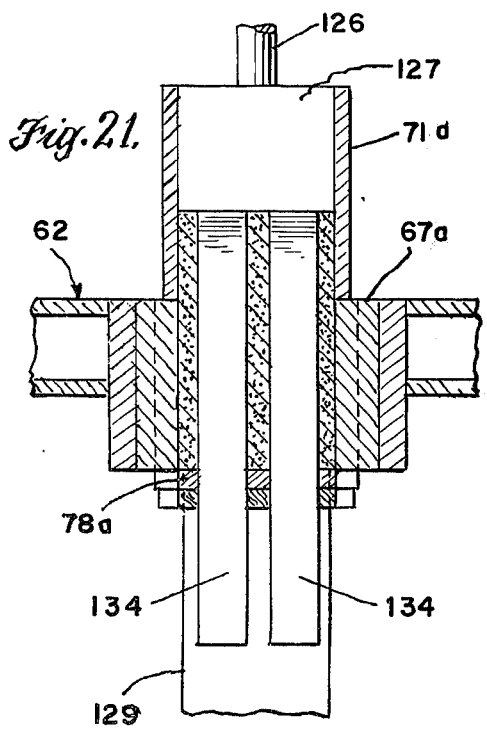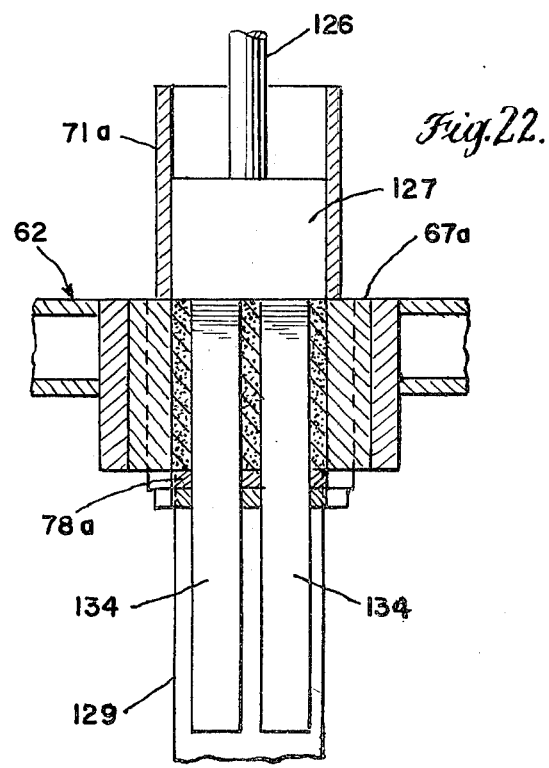

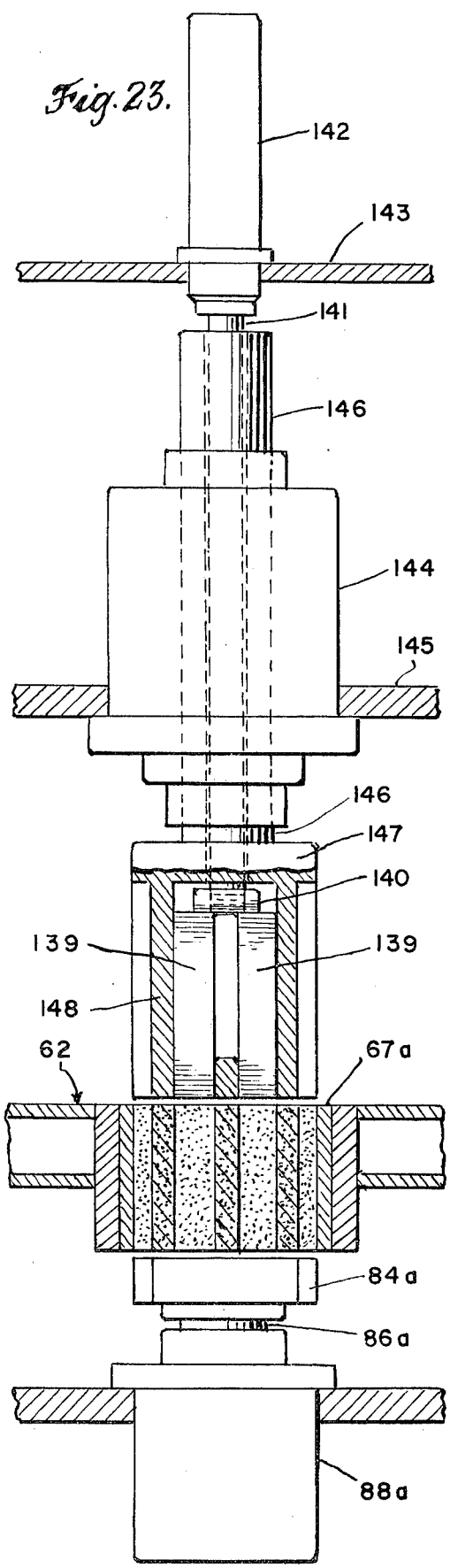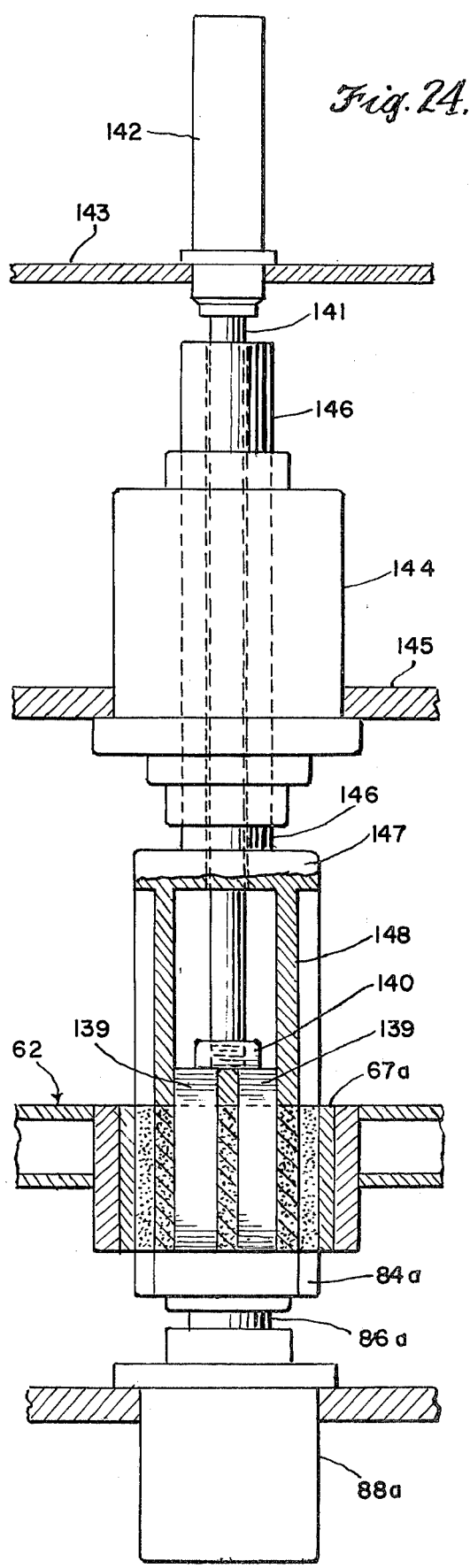

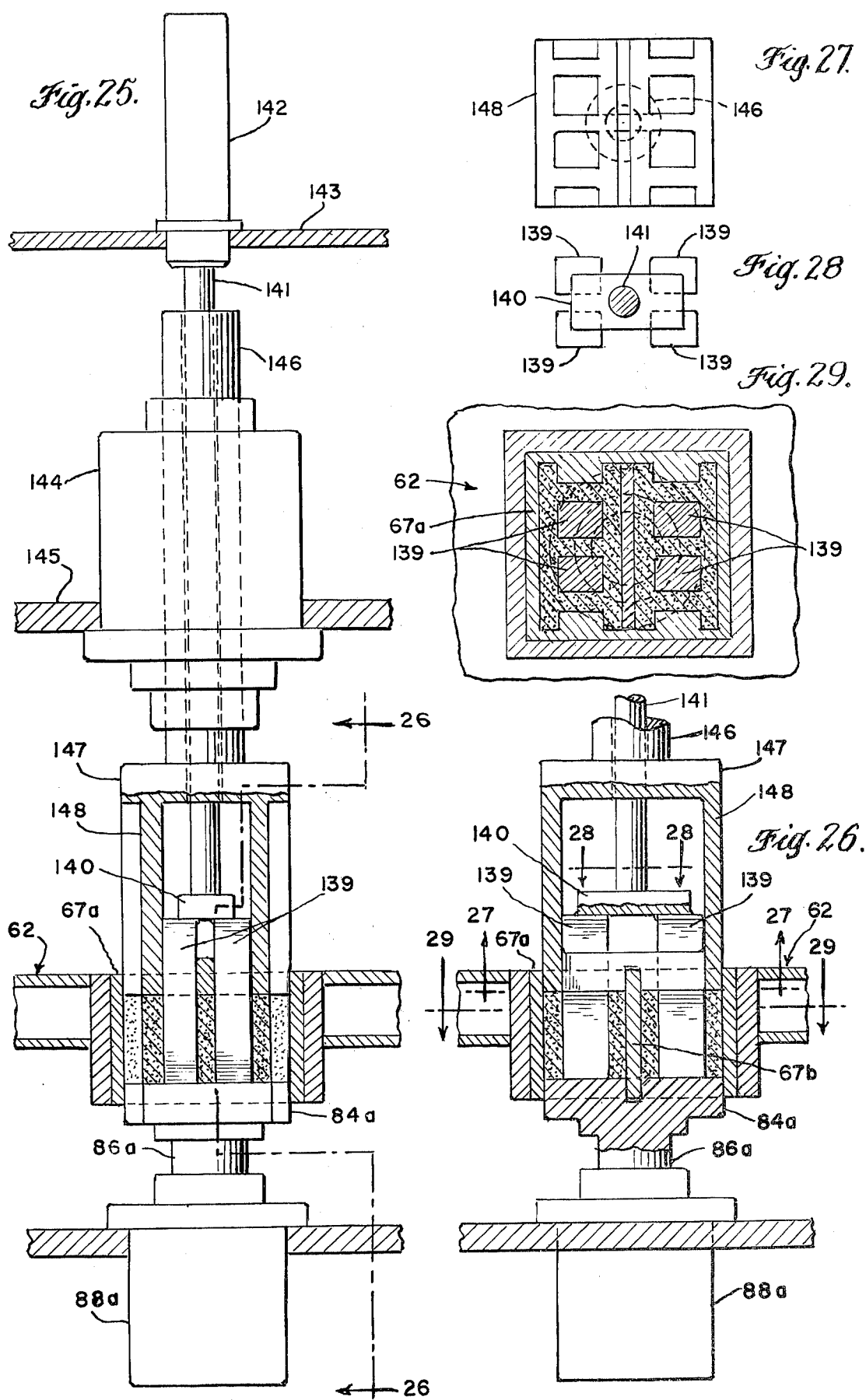

BRICK PRESS AND ASSOCIATED EQUIPMENT FOR MAKING BRICKS

GENERAL FIELD AND OBJECTS OF THE INVENTION

The invention is concerned with the production of molded building components, especially molded bricks or blocks either of the solid type or the hollow type. The invention is concerned with techniques for making such bricks and provides an overall system for brick production, and especially an improved brick press.

One of the important general objectives of the invention is to provide a high capacity brick press.

A further objective of the invention is to improve the quality of the bricks produced, particularly with respect to the uniformity of compression and internal structure of the bricks.

Still further, the invention provides equipment for large scale brick production with a minimum of manual handling of either the material or of the bricks and also with a minimum of required personnel or attendants.

Another objective of the invention is to provide brick press equipment in which a multiple mold turntable is provided and in which mechanism is associated with the turntable for establishing a plurality of series of operating stations associated with the mold turntable and through which each mold is carried as the molds are advanced stepwise by the turntable. In the press equipment embodying a plurality of series of operating stations, the invention contemplates disposition of the several operating stations about the axis of the turntable in angularly spaced relation and in the preferred embodiment two series of operating stations are provided, with precompression, high compression and ejection stations in each series positioned in pairs at locations diametrically opposite to each other, in order to provide a balance of forces symmetrically about the axis of the turntable. This serves another objective, namely to make possible the employment of a press structure capable of operating at high compression and other loads, while maintaining the overall size and weight of the equipment at a minimum.

In accordance with still another aspect of the invention, the press itself and also various of the associated components of the overall system or plant in which the press is incorporated, are arranged so that they may be employed in the production of bricks from various different materials, with a minimum of alteration of the components. For example, the brick press itself and also various of the associated materials preparation and feeding apparatus, may readily be employed in the production of sand-lime bricks or in the production of bricks formed of lateritic soils, for instance in the general manner disclosed in British Pat. No. 1,345,583, filed Mar. 22, 1971.

Still another objective of the invention is the provision of brick press equipment having a mold turntable in which the brick molds may readily be changed in order to provide for the molding of bricks of various sizes and types. Similarly, in the equipment providing the molding stations, provision is made for convenient substitution of various press parts in order to cooperate with different molds, so as to make possible convenient and rapid change from production of bricks or blocks of one type to production of bricks or blocks of another type.

BRIEF DESCRIPTION OF THE DRAWINGS

With the foregoing in mind attention is now directed to the accompanying drawings which illustrate preferred embodiments of the invention, and in which:

FIG. 1a is a diagrammatic view of a device for feeding brick coloring material into the system of FIG. 1;

FIG. 3 is a vertical sectional view of the press equipment taken as indicated by the section line 3—3 in FIG. 2 and illustrating the measuring, the mold charging, and precompression portions of the equipment;

FIG. 5 is a view in vertical section of measuring and feeding devices employed in the equipment shown in FIGS. 2, 3 and 4;

FIG. 6 is an enlarged view of a device employed to adjust the size of the mold charge;

FIG. 7 is an elevational view of multiple prong press elements employed at the precompression stations of the equipment;

FIG. 8 is a view of a multiple pronged brick ejection press element employed;

FIG. 16 is a vertical sectional view through certain parts which may be employed in equipment such as shown in FIGS. 2 to 10 at the precompression stations, in order to produce hollow instead of solid bricks;

FIG. 16a is a vertical sectional view of the structure shown in FIG. 16 but taken in a plane at right angles to FIG. 16;

FIGS. 17, 17a and 17b are transverse views taken as indicated by the lines 17—17, 17a—17a, and 17b—17b in FIG. 16;

FIGS. 18, 19, 20, 21 and 22 are views of the equipment shown in FIG. 16 with various of the parts shown in different positions;

FIGS. 23, 24 and 25 are elevational views, with parts in section, showing equipment provided at the high compression station in the embodiment employed for the production of hollow bricks or blocks, these three views also showing parts of the equipment in different operating positions;

FIG. 26 is a vertical sectional view of parts shown in FIGS. 23, 24 and 25, taken on the irregular section line 26—26 applied to FIG. 25; and FIGS. 27, 28 and 29 are views illustrating certain parts shown in FIGS. 23 to 26, and taken as indicated by the section lines 27—27, 28—28 and 29—29 on FIG. 26.

THE OVERALL SYSTEM - FIG. 1

Although, as above indicated, the press equipment of the present invention may be used in a wide variety of systems for the making of bricks from various materials, the press equipment is particularly adapted to the making of bricks from materials at least in large part comprising granular constituents such as soil or sand, and the press equipment is particularly suited to the handling, compressing and molding of granular materials which are essentially free-flowing, i.e., which, notwithstanding the presence of some moisture, constitute a mass which will flow by gravity from a feeding hopper through a feed chute and into a charge measuring device.

Figure 1:
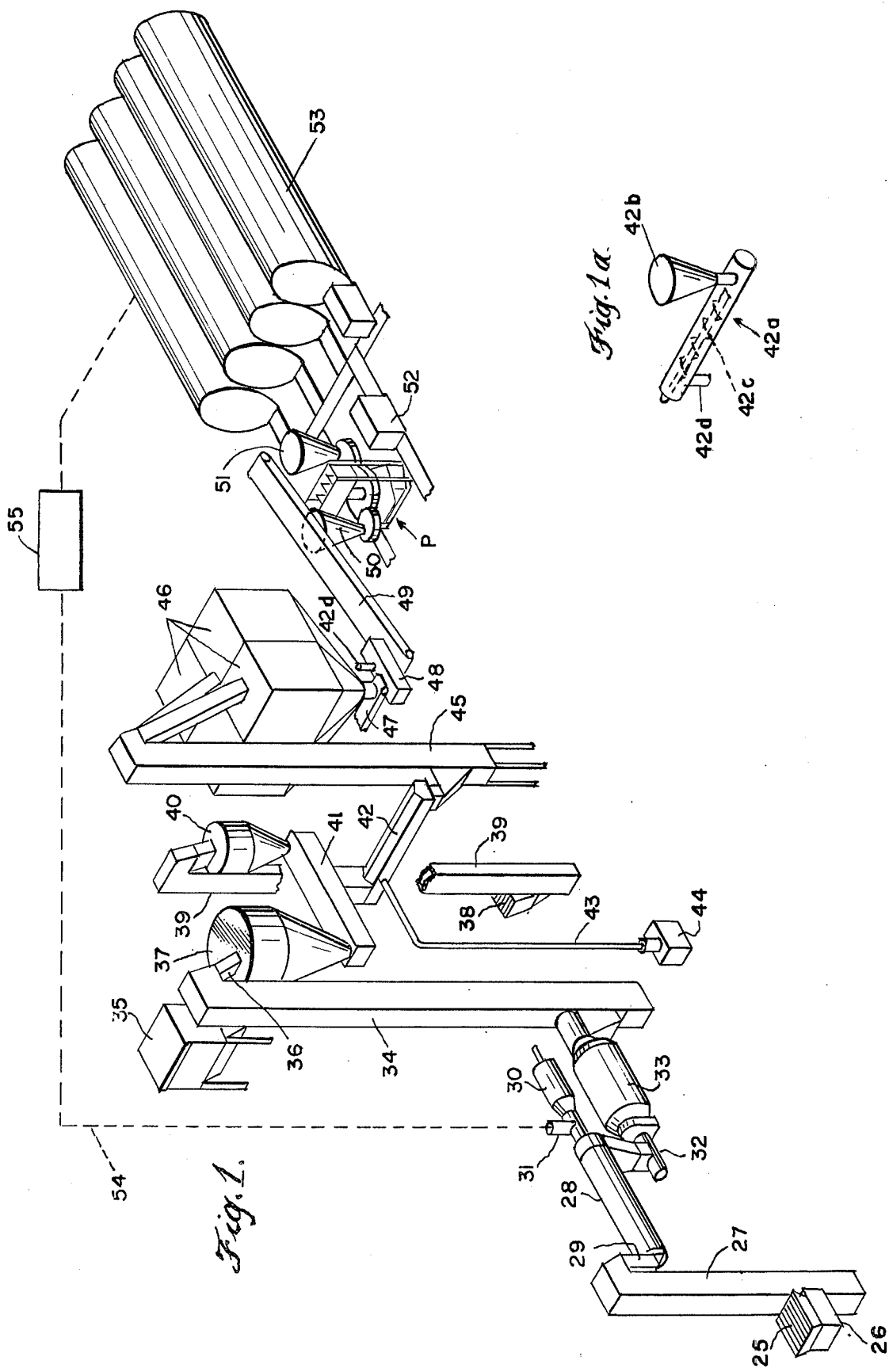
FIG. 1 is an overall somewhat schematic isometric view of a brick production plant incorporating press equipment, with the plant and press equipment constructed according to the present invention.

Referring to FIG. 1, the press itself is somewhat diagrammatically indicated in outline at P. Other equipment shown in FIG. 1 comprises the equipment (shown toward the left of the press) for the preparation of the granular material to be delivered to the press molds, and the equipment (shown toward the right of the press) which is provided for the purpose of curing of the bricks made by the press.

Although, as above indicated, the press itself and also various portions of the system shown in FIG. 1 may be employed in the production of bricks of various granular materials, a typical example is the use of the equipment and the press in making bricks from lateritic soil according to the technique generally described in the British patent identified above. This particular use of the system shown in FIG. 1 is herebelow briefly described by way of illustration.

Before considering the system of FIG. 1 it is also pointed out that the individual components, except for the press itself, are all of known type and need not be considered in detail herein. They are illustrated only diagrammatically or in outline and are described only generally, as the details of the construction of the individual components forms no part of the present invention per se.

Lateritic soil is delivered to the system through the grate of the dump hopper 25 and the soil then falls by gravity into a preliminary grinding mill 26 for the purpose of breaking up lumps. A bucket conveyor 27 raises the preliminarily ground material to the inlet of the drying tumbler 28, an air lock 29 being provided between the conveyor 27 and the tumbler 28. An air heater 30 circulates air into the tumbler 28 from which the moisture laden air may be discharged through the outlet 31. The tumbled and dryed material drops into the feed device 32 which delivers the material into a rod mill or a swing mill 33 provided for breaking up the lumps and particles into granules of whatever size is desired in the preparation of the granular material to be charged into the molds. The material is discharged from the mill through a rotating screen into a bucket conveyor 34, the upper end of which is associated with a dust collector 35 and also with a granule feed chute 36 delivering the material into the hopper or silo 37.

An additive for developing a binder in the bricks may be introduced into the system through the grate 38 into the lower end of the bucket conveyor 39 which carries the additive up to the hopper or silo 40. In making bricks from laterite this additive should be lime, as is disclosed in the British patent above identified.

Weighing or measuring equipment 41 receives material from the hoppers 37 and 40 and delivers these materials in appropriate proportions into the mixer 42. Water (together with other additives, if desired) is introduced into the mixer 42 through the supply line 43 which is supplied by the measuring pump 44. The mixture is then carried by the bucket conveyor 45 upwardly for discharge into one or another of the storage silos indicated at 46. From these silos, the material is delivered by a conveyor 47 into a final mixer 48 which discharges the material onto the conveyor belt 49 for delivery to the press hoppers 50 and 51. Bricks made by the press may be carried by pallets 52 into the curing equipment or chambers indicated at 53.

The final mixer 48 may be used to introduce other additives or water. For example, coloring material such as pigment may be introduced by a feeding and measuring unit such as illustrated diagrammatically at 42a in FIG. 1a. Here a vibratory screw 42c receives the coloring material from the hopper 42b and delivers the material at a steady rate through the discharge connection 42d which delivers into the mixer 42 as indicated in FIG. 1.

Before analyzing the construction of the press itself, it is noted that in the system in FIG. 1 the soil is dryed before introduction into the mill 33 and this is desirable for purposes of operation of the mill, and in addition it is also desirable to bring down the level of moisture in the material taken for use so that the moisture content may more readily and accurately be adjusted and brought to the desired value by the addition of water delivered into the mixer 42 by the pump 44.

The capacity of the silos 37 and 40 need only be sufficient to supply mixer 52 for a short time, for instance, one-half hour, but it is preferred that the storage silos 46 provide sufficient capacity for storage for at least several hours which is desirable in the handling of various granular materials in which additives and binder-forming constituents are introduced. This time interval of storage assists in preparing the material for the subsequent precompression and compression operations effected in the press equipment itself.

In the production of bricks from lateritic soil, lime and water, it is contemplated that the curing chambers 53 be maintained at a temperature of the order of 97° to 98° C and at atmospheric pressure, with a humidity close to saturation, for instance, upwards of about 95% relative humidity. Since air is used for drying the material in the tumbler 28, the resultant humid air may be circulated from the tumbler through the connection 54 to the curing chambers 53. If desired, additional moisture may be introduced into this air by a humidifier indicted at 55.

When making lateritic bricks it is ordinarily desired to maintain the bricks at the curing temperature and at the high humidity for a number of hours, for instance 20 hours, and in view of this, it is contemplated that the curing station 53 comprise a number of chambers providing reasonable capacity for brick storage during the curing operation.

It will be understood that when the brick press of the present invention and the system shown in FIG. 1 is employed for the making of other types of bricks, for instance, sand/lime bricks, the humidified atmospheric pressure curing chamber 53 may be replaced by appropriate autoclaves, as ordinarily employed in the production of sand/lime bricks. In this case, some other changes in the system may be desired, but many of the components and system connections may remain the same as illustrated and described.

COMPONENTS FOR MAKING SOLID BRICKS - FIGS. 2 TO 10

In considering the press mechanism, attention is first directed to FIGS. 2 through 10 inclusive, which illustrates the general structure of the press and also shows the manner of use of the press with multiple molds each of which has five cavities for forming solid bricks. It is to be understood that the general structure of the press is adapted for use not only with molds for forming solid bricks, but also for molds for forming hollow bricks, which latter are shown in detail in the sequence of figures beginning with FIG. 16.

Although the press may have a frame or base structure constructed in various ways, in the embodiment as illustrated in FIGS. 2 to 10, the frame structure is made up of tubular vertical posts or columns 56 having base or support channels 57 and upper and lower horizontal frame plates such as shown at 58 and 59 interconnecting the posts 56. Transverse webs 60 may also be provided, together with any other desired interbracing elements. The upper and lower horizontal frame elements 58 and 59 serve to mount the rotatable shaft 61 which carries the turntable indicated generally at 62 which is rotated in the direction indicated by the arrow in FIG. 2 by any suitable motor driven shaft 63 carrying pinion 64 meshing with gear 65 which is connected with the shaft 61. Appropriate axis structure 66 serves to mount the turntable on the central shaft 61.

The turntable is provided with apertures or cavities adapted to receive any desired type of mold. There are hereshown a series of molds or mold devices indicated at 67, in the embodiment illustrated there being six such mold devices angularly spaced about the axis of the turntable 62, so that the mold devices lie in radial planes at 60° from each other.

In the equipment shown in FIGS. 2 through 10, mechanism is provided including reciprocable press elements arranged to define a plurality of operating stations angularly spaced from each other about the central shaft 61 of the turntable and providing for various of the operating steps or functions above briefly referred to. In analyzing the equipment provided for establishing the operating stations, it is first pointed out that the operating stations contemplated according to the present invention include a mold charging and precompression station, a high pressure mold station, and a brick ejection station. In the embodiment illustrated, there are two series of such operating stations associated with the mold turntable. Thus, there is a total of six operating stations around the axis of the turntable and since there are six molds carried by the turntable, a mold is available for each of the operations performed in all three of the operating stations of each of the series thereof. Since the series of operating stations is duplicated, only one of the series need be described in detail and for that purpose reference is made to the left hand portions of FIGS. 2, 3, 9 and 10, as well as, to some of the corresponding parts as shown in FIGS. 4, 5, 6, 7 and 8.

Figure 2:
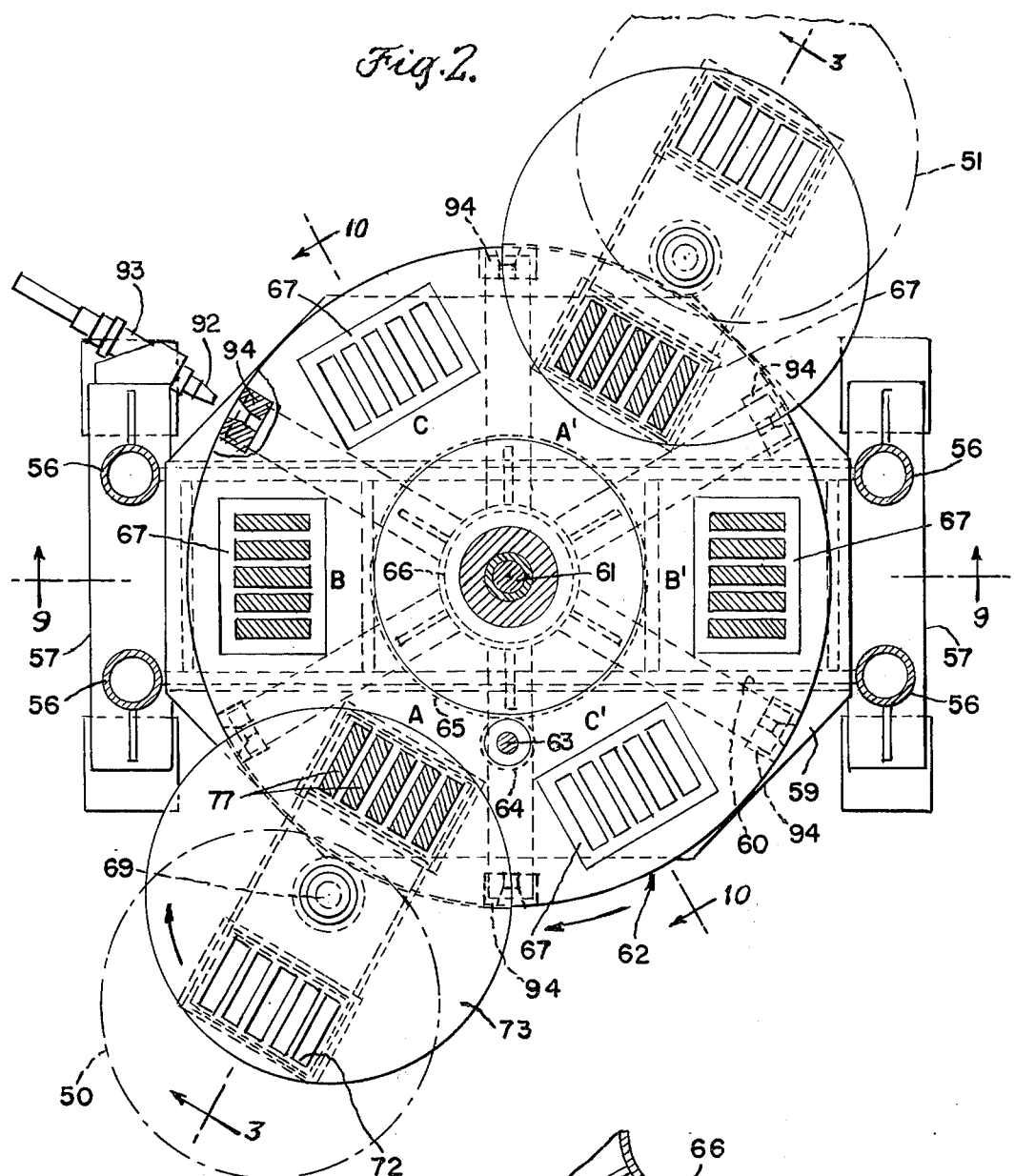
FIG. 2 is a plan view, with some parts in horizontal section, of a brick press constructed according to the present invention, and especially illustrating the mold turntable and showing the use of molds for forming groups of five plain or solid bricks, this view being taken as indicated by the section line 2—2 applied to FIG. 3.
Figure 4:
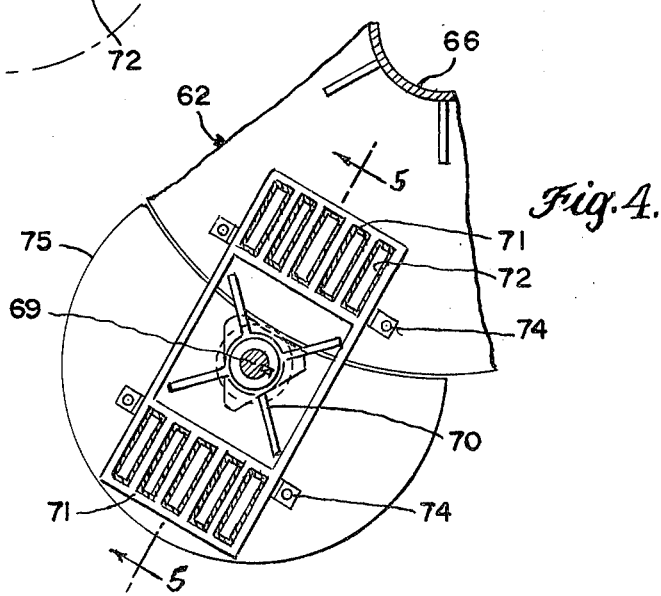
FIG. 4 is a fragmentary plan section taken as indicated by the section line 4—4 in FIG. 3.

Toward the left in FIGS. 2 and 3, a dot-dash line indicates the material supply hopper 50 (see also FIG. 1).

The bottom of this hopper has a chute 68 which delivers the granular material to be charged into the molds, into the measuring and transfer equipment described just below.

A vertical shaft 69 is rotatively mounted in a position just beyond the periphery of the turntable 62, this shaft carrying a spider or hub structure 70 which, in turn, carries measuring mold parts 71, the upper portions of which are telescoped with cooperating mold parts 72 mounted on a disc or plate 73. The upper and lower portions of the measuring molds may be telescoped to a greater or lesser extent, thereby adjusting the size or volume of the charge received by these measuring devices. At a plurality of points spaced around spider or hub structure 70, jack screws 74 are provided (see FIG. 6) whereby the upper and lower parts of the measuring devices may be adjusted and fixed in adjusted position. Below the lower ends of the parts 71 of the measuring devices, plate 75 is provided in the plane of the top surface of the turntable 62 (see FIGS. 3 and 4) which serves to close off the lower open ends of the measuring devices.

This assembly of measuring parts 71 and 72 constitutes a secondary turntable cooperating with the mold turntable 62, and the shaft 69 of the secondary turntable may be turned, for instance, in the direction indicated by the arrow in FIG. 2, as by a motor 76 whose operation is timed with other control functions as later described, so that periodically a charge of material delivered from the hopper 50 into one of the measuring devices 71–72 is carried from the loading position into position over the turntable 62 so that delivery of charges of the granular material into the molds may be effected under the influence of the precompression piston elements to be described. Instead of being rotated or turned by a motor as indicated at 76, the shaft 69, and the measuring devices 71–72 may be periodically oscillated as by means of a pair of piston and cylinder devices.

As with the molds carried by the turntable, in the embodiment illustrated, the measuring devices 71–72 are each provided with five cavities, so that individual charges of the granular material to be molded are carried from the measuring or loading position below the hopper 50 to the mold charging position over the turntable 62.

As above mentioned, the mold turntable 62 is provided with a plurality of molds 67 arranged around the turntable, and the associated equipment establishes two series of three press stations, and for convenience in the following description, one of these series of press stations is identified by the letters A, B, and C. The second similar series is identified by the letters A', B' and C'.

Press station A, see particularly FIG. 3, is a mold loading and precompression station and, when using molds for making solid bricks, this station is established by the provision of a pair of press plungers 77 and 78, each of multiple prong construction, (see FIG. 7), so that a press plunger prong is provided for each brick cavity in the mold. These press plungers are carried by piston rods 79 and 80 adapted to be operated by pistons working in hydraulic cylinders 81 and 82. By means of these press elements the charge of granular material carried by the measuring devices 71–72 is delivered into each mold 67 as it reaches station A and is subjected to precompression therein in the manner described hereinafter with particular reference to FIGS. 11 and 12.

Figure 9:
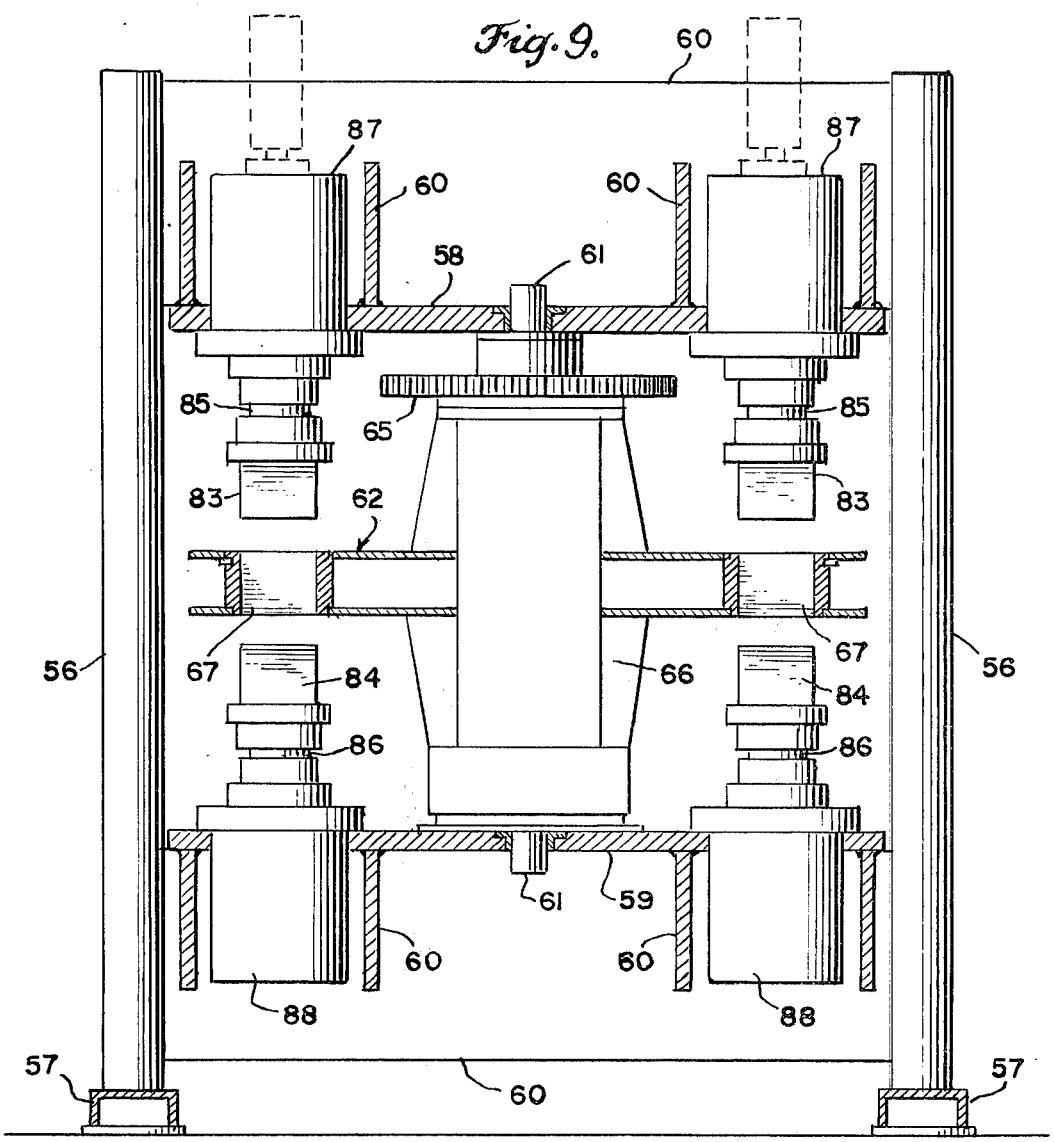
FIG. 9 is a vertical sectional view of the press equipment taken as indicated by the sectional line 9—9 in FIG. 2 and illustrating the compression or high pressure press equipment.
Figure 10:
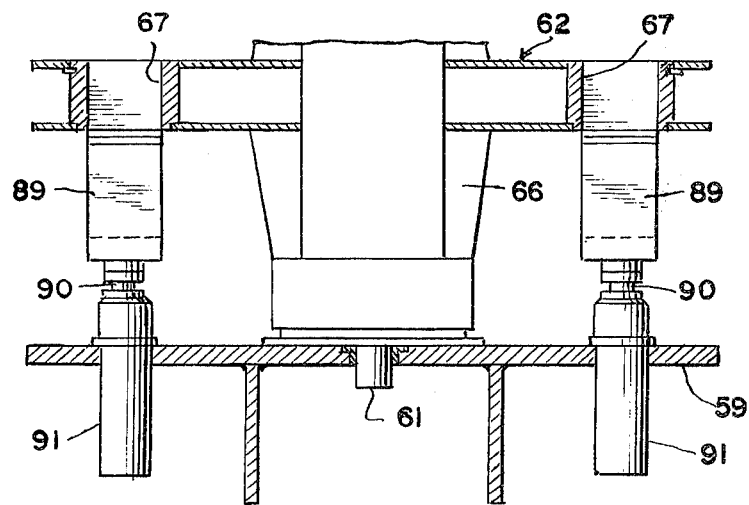
FIG. 10 is a fragmentary vertical sectional view taken as indicated by the section line 10—10 in FIG. 2, and illustrating the ejection equipment employed.

Mold station B comprises a high compression molding station and as seen in FIG. 9 is established by a pair of press plungers 83 and 84 carried by piston rods 85 and 86 adapted to be operated by pistons provided in hydraulic cylinders 87 and 88. These press elements (83 and 84) are also desirably of multiple prong construction in order to cooperate with the multiple cavities of the mold. The operation of these press elements will also be described hereinafter with reference to FIGS. 11 and 12.

The third press station C (see FIG. 10) is established by an ejection or striper mechanism 89 carried by a piston rod 90 actuated by a piston in hydraulic cylinder 91. The device 89 is also of multiple prong construction as will be seen from FIG. 8, but in this instance, various prongs are of different length so that upon actuation of the ejection mechanism, the bricks are loosened and displaced sequentially, thereby reducing the force required to operate the ejection mechanism. The ejection mechanism is also referred to hereinafter in connection with FIG. 11.

It will be understood that similar press and ejection mechanisms are employed in order to establish the press stations identified by the letters A', B' and C'. Moreover, as will be seen from FIGS. 2 and 3, it will be understood that the mold loading and precompression station described above with particular reference to FIGS. 2, 3, 4, 5 and 6 is duplicated in a position to cooperate with station A' which is the loading and precompression station of the second series of stations.

Referring further to FIGS. 2 to 10 inclusive, it will be seen that in the two series of press stations established about the axis of the turntable 62, the two loading and precompression stations are located symmetrically with respect to the axis of the turntable at 180° from each other, as are the two high pressure stations and the two ejection stations. In consequence, the forces and reactions between upper and lower press members and other forces applied not only to the structure establishing the several press stations but also the the turntable itself and the molds are all symmetrically balanced about the axis of the turntable, in view of which adequate strength is provided with a minimum of weight and structure of the mounting mechanism as well as in the turntable.

It is desirable that the turntable be accurately positioned at each operating position and for this purpose, a mechanism is provided (see FIG. 2) comprising a reciprocable plunger 92 operated for example by a hydraulic cylinder 93, the plunger is adapted to be received in a socket such as indicated at 94 arranged in the periphery of the turntable 62. Such a socket is provided between each pair of adjacent molds around the turntable, as is shown in FIG. 2.

ANALYSIS OF BRICK COMPRESSION - FIGS. 11 TO 15

Figure 11:
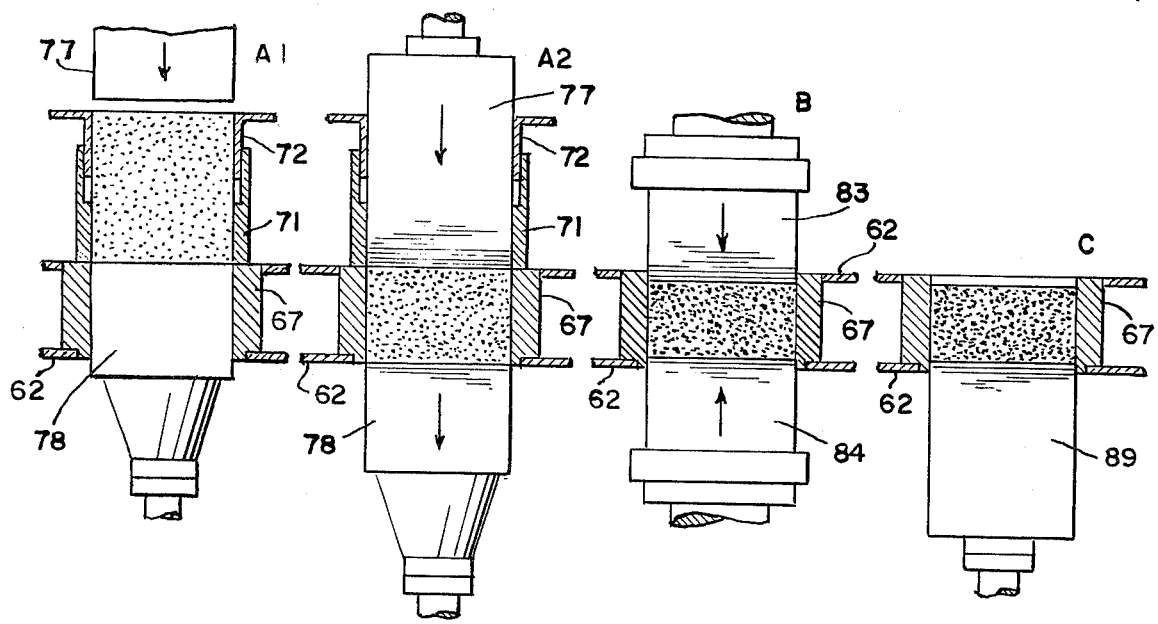
FIG. 11 is a sequence of fragmentary views illustrating certain stages in the making of a brick, at various of the operating stations of the press.

In FIG. 11 the press stations are indicated and portions of the press elements shown in certain positions. In the first two portions of FIG. 11 marked A1 and A2, the parts are shown in two different positions at the loading and precompression station A. The high compression and ejection stations are indicated by the letters B and C respectively.

In the sequence of views shown in FIG. 11 only a single brick cavity of the mold is shown, but it will be understood that the same operations will occur for each brick cavity.

As shown at A1 in FIG. 11, the press member 78 has been advanced upwardly through the mold 67 to a position where the top of the press member is at the same level as the top of the turntable 62, i.e., up to the upper end of the mold 67. The press plunger 77 is shown just before engagement with the charge of material in the measuring device 71–72. Referring next to the condition shown in A2, it will be seen that the press member 78 has moved downwardly to a position at the bottom of the turntable, i.e., at the bottom end of the mold 67, and in addition, the upper press plunger has descended to bring its lower face down through the measuring device 71–72 to the upper face of the turntable, i.e., to the upper end of the mold. In moving from the positions shown in A1 to the positions shown in A2, it will be observed that the press plunger 77 has moved a greater distance than the press plunger 78. In consequence of this, not only has the charge of material been transferred from the measuring device 71–72 into the mold, but in addition, the charge of material has been compressed.

After withdrawal of the precompression press elements 77 and 78 and advance of the turntable to carry the mold from station A to station B, the high compression press members 83 and 84 now enter the top and bottom of the mold as shown at B in FIG. 11. This subjects the charge to additional compression.

After withdrawal of the press members 83 and 84 and further advancement of the turntable 62, the press ejection station is reached and at this point the ejection device 89 moves upwardly into the mold and ejects the brick through the upper open end of the mold to a position on the top of the turntable, and from this point the bricks are taken away, for instance by stacking on pallets or the like for delivery into a curing chamber, as briefly described above with reference to FIG. 1.

The foregoing loading, precompression and high compression stages of the press operation have certain important advantages which are explained just below with particular reference to FIGS. 11 and 12, the latter of which shows comparative stages of shifting movement and compression of the charge of granular material in a given mold.

First note that the overall or total compression of the charge is divided into two stages of compression, one of which, the precompression stage accomplished at station A, is of much greater extent than the latter, which is accomplished at station B. This is of advantage and importance because it is only in the final portion of compression in which very high pressures are needed, and such high pressures are much more economically and readily obtained with a very short press stroke. In the precompression stage a greater stroke is needed, but the pressure need not be as high.

In this way, a similar interval of time of press operation may also be utilized for both the precompression and high compression stages of the brick molding, and this is desirable in order to attain conditions permitting minimum time at each press station, with consequent increase in production with a given press.

In a typical press operating in the manner just described, a pressure of about 20 kg/cm$^2$ may be developed in the precompression station, with a reduction of the volume of the charge to about two thirds of the original volume in the measuring device; and in the high compression station a pressure of 300 kg/cm$^2$ may be attained, with a volume reduction down to about three-quarters of the volume following the precompression stage.

Each step of the operation may be accomplished in a total press stroke time of four seconds, which time is made up of one and one-half seconds for turntable turning time and two and one-half seconds for the hydraulically induced motions of the press members.

Figure 12:
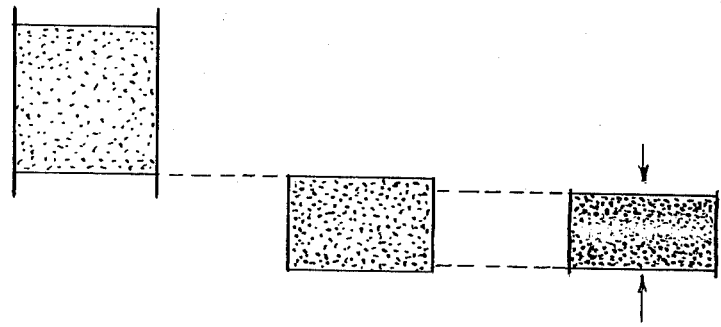
FIG. 12 is a diagrammatic view of the stages of brick compression effected in accordance with FIG. 11.
Figure 14:
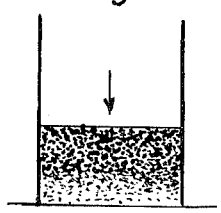
FIGS. 14 and 15 are diagrammatic views illustrating, by way of comparison with FIGS. 11 and 12, certain characteristics of bricks made in accordance with some prior art techniques.

In addition to the foregoing advantages, the sequence of operations represented in FIGS. 11 and 12 has another important advantage which is related to the uniformity of the bricks produced. This matter can best be explained by reference to certain alternative operations which are diagrammatrically represented in FIGS. 14 and 15. FIG. 14 indicates a condition of compression of granular material in a molding operation where the entire compression of an initial charge of the same volume as in FIG. 11 is accomplished by the movement of one piston into the upper end of a mold.

Because of certain known behavior tendencies of granular materials placed under pressure in a mold, the application of the pressure to compress the charge by only a single moving press plunger has a tendency to concentrate the compression in the volume of the charge adjacent to the moving press member. In consequence, the compression is not uniform throughout the depth of the charge being compressed and this non-uniform compression is indicated in FIG. 14 by the heavy stippling in the upper portion of the brick and the lighter stippling in the bottom portion. The extent to which this graduation of the compression takes place is dependent upon the length of the stroke with respect to the mold wall in order to effect the compression. It will be noted in connection with FIG. 14 that the upper portion of the compressed charge has experienced extensive downward movement with respect to the side walls of the mold, and that the lower portion of the charge has experienced little, if any, downward motion with respect to the side walls of the mold. The difference in compression of the upper and lower portions of the charge is directly related to the motion of the charge with respect to the mold walls. The tendency to stratify is accentuated where the particulate material is fine grained.

Figure 15:
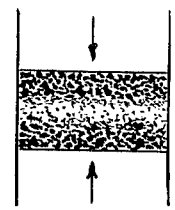

In FIg. 15, there is illustrated a system in which the compression of the charge is effected by motion of two press elements, one above and the other below the charge, but in which the entire compression is effected by equal and opposite press strokes of two press elements. In this case, both the uppermost layer and the lowermost layer of the charge will have considerable motion with respect to the side walls of the mold, but because of the length of the strokes both the uppermost layer and lowermost layer will experience much greater compression and will be of greater density than the intermediate layer. This is indicated in FIG. 15 by the heavy stippling in the uppermost and lowermost layer and the lighter stippling in the intermediate layer.

While the arrangement of FIG. 15 results in less pronounced stratification than FIG. 14, FIG. 15 also produces considerable stratification in the texture of the compressed charge and from the standpoint of uniformitY of strength of the product, this stratification is disadvantageous. The foregoing difficulty is in large part eliminated by the sequence of press operations described above in connection with FIG. 11. From FIGS. 11 and 12, it will be seen that during the precompression stage A, which represents the largest portion of the compression volumetrically, all of the material of the charge is being moved with respect to the mold walls, and we have found that this largely eliminates the stratification tendencies in this phase of the operation. The remaining compression which occurs in high compression stage B of the press operation represents only a very small reduction in volume from the precompressed stage, and in view of this, much less stratification occurs.

From the foregoing, it will be seen that most of the compression of the brick is carried out while the charge is being moved downwardly along the surfaces of the measuring device 71–72 and of the mold 67. We have found that the bricks produced in this manner, manifest more uniform strength characteristics throughout the internal structure of the bricks even when very fine grain material is used.

Figure 13:
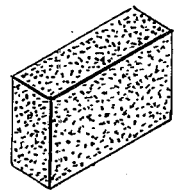
FIG. 13 is an isometric view of a single brick prepared by the equipment as illustrated in FIGS. 1 to 11.

In FIG. 13 a brick is isometrically illustrated in the typical shape as ejected by the mechanism 89 at press station C.

PRESS CONTROL

Since the turntable may be turned and the press elements actuated by any desired controls or control system, it is not thought necessary herein to describe the details of such controls. However, several points may be noted, as follows:

The mold turntable 62 which is adapted to be rotated by the gear 65 meshing with the pinion 64 in turn driven by the pinion shaft 63 which may comprise the power shaft of any suitable motor operated intermittently in order to advance the turntable stepwise and bring the molds sequentially to each press station.

COMPONENTS FOR MAKING HOLLOW BRICKS - FIGS. 16 TO 29

The general structure of brick press may be arranged to accommodate molds and press elements for making solid bricks, as above described, or may be arranged to accommodate molds and press elements for making hollow bricks, or may be arranged to alternatively accommodate either kind of molds and press elements. In any event, various molds and press elements as shown in FIGS. 16 to 29 are preferably employed when it is desired to make hollow bricks or blocks. Certain hydraulic cylinders shown in FIGS. 16 to 29 are also indicated in dotted outline in FIGS. 3 and 9.

The shape of one form of hollow block which may be made will be clear from FIGS. 17 and 29. A pair of such blocks will be seen in cross section in FIG. 29, and the shape of precompression elements for making such blocks is illustrated in FIG. 17, and the shape of corresponding high compression elements is shown in FIG. 27.

Because of the fact that the bricks here being made have interior cavities, it is necessary to use press or mold equipment in which cores are employed in order to define the interior cavities of the hollow bricks. Also, in order to effect compression of the particulate material of the bricks, it is necessary to employ press elements which are configured to conform with the cross section of the bricks, as is seen in FIGS. 17 and 27.

Equipment incorporating such cores is shown in FIGS. 16 to 29 inclusive and in this series of figures, only certain of the press and turntable parts are shown. Thus, the mold turntable is indicated at 62, as in FIGS. 2 to 10, but only one of the series of molds is shown in FIGS. 16 to 29. The mold structure here shown at 67a is shaped to define the outside contours of a pair of bricks or blocks of the kind shown in FIG. 29, instead of the molds of FIGS. 2 to 10 which provide for making five solid bricks at each station. Since two hollow blocks are here being formed a divider 67b is positioned in the mold between the two blocks (see FIG. 16a).

FIGS. 16 to 22 inclusive, indicate a sequence of positions of parts occurring in the precompression molding station, for instance a station corresponding to station A as fully described above in connection with FIGS. 2 to 10 inclusive. At this precompression station, the upper press components comprise a hydraulic cylinder from which the piston rod 126 projects downwardly to carry the generally rectangular press element 127, having a lower pressing surface adapted to overlie the entire upper end of the hollow blocks being made.

The press components which are mounted below the turntable comprise both core members to define the cavities in each block and also press elements configured to engage the lower end surface of the blocks around the cavities. The press elements are shown at 78a not only in the vertical sectional views of FIGS. 16, 16a and 18 to 22 but also in the plan view of FIG. 17. The various portions of this press element 78a are mounted upon a pair of spaced vertical plates 129 which extend downwardly, with their lower ends fastened to opposite edges of the cross plate 131 which is connected with the piston rod 132 extended from the upper end of the hydraulic cylinder 133, which cylinder is mounted on fixed press structure and which effects and controls the upward and dowward movement of the press element 78a in accordance with cycles of operations to be described herebelow.

The lower press elements at the precompression station further include the core members 134 each of which serves to define and form one of the two cavities in one of the hollow bricks being made. These core members are connected at their lower ends with the mounting plate 135 and a pair of hydraulic cyllinders 137 mounted on the fixed press structure 130 have upwardly extending piston rods 138, the piston rods in turn being connected with the mounting plate 135 for the cores 134.

By the mechanisms above described, the cores 134 are vertically movable within the parts of the press elements 78a, and the various movements of the cores and press elements are controlled in the manner to be described below.

It is first pointed out that at the precompression station represented in FIGS. 16 to 22, as in the first embodiment described above, a measuring and charging mechanism is provided in order to introduce a measure charge of particulate material into each mold as it is carried into the precompression station of the press. This measuring and loading equipment is only diagrammatically indicated in FIGS. 16, 16a and 18 to 22, the numeral 71a being applied to the diagrammatic showing of the measuring device. In FIG. 16, with the measuring device 71a offset toward the left, there is also a dot and dash indication at 50 of a particulate material feed hopper which may be employed in the manner described above for the loading of the measuring device 71a.

Referring now specifically to the sequence of operations represented by FIGS. 16 and 18 to 22, it is first noted that in FIG. 16, the upper press member 127 is in an upper position above the upper level of the measuring device 71a, and the cores 134 are in the lower position, below the lower end of the mold 67a. In addition the lower press element 78a is also positioned with its upper end below the mold.

Referring now to FIG. 18, as the measuring device 71a containing the charge of particulate material to be introduced into the mold approaches a position overlying the mold, both the cores and the press element 78a are elevated sufficiently to enter the mold and bring the upper surface of the cores and press element to the plane of the upper surface of the turntable 62, to thereby close the mold cavities. This position is maintained until the measuring device 71a has moved to a position between the upper press element 127 and the lower parts as just described. Thereafter, the press element 78a commences its downward motion, as indicated in FIG. 19, but the cores remain in an upper position. The lowering of the press element 78a permits portions of the charge in the measuring device 71a to drop into the spaces between and surrounding the cores. The cores are now raised, as indicated in FIG. 20, part way into the measuring device 71a. At the same time the press element 78a is lowered to the bottom of the mold as shown in FIG. 20, and at this time a large part of the entire charge of particulate material has been transferred into the mold in the spaces between and surrounding the cores, but the particulate material has not yet been compressed. The upper press element 127 is now brought down to the cores, as shown in FIG. 21, and with the upper ends of the cores in contact with the upper press element 127, the cores and upper press element descend toward the mold and the lower press element 78a remains in its position at the lower end of the mold. The action of the descending upper press element 127 subjects the charge of material to be desired precompression. This precompression stroke continues until the position shown in FIG. 22 is reached. Thereafter, the upper press member 127 is withdrawn upwardly and the cores 134 are withdrawn downwardly after which the mold with the precompressed hollow blocks therein is advanced by the turntable to the high compression station which is preferably equipped with press components of the kind described below.

The arrangement of the components employed at the high compression station when making hollow bricks also includes core elements in addition to the press elements, but these elements are differently arranged than the corresponding parts at the precompression station. Some of the chief differences include the fact that the piston and cylinder devices for the core elements and the press elements are arranged so that the cylinders for the core elements and the cooperating press elements are coaxial, the piston rod extended from one of the cylinders being extended through a hollow piston rod which is extended from the other cylinder. The manner in which this is arranged is explained herebelow with particular reference to FIGS. 23 to 26.

Referring now to FIG. 23, it will be seen that the lower high pressure cylinder and piston device 88a is arranged below the mold turntable 62, and the piston rod 86a of this device carries a press member 84a having a top surface with an area extended through the entire area of the cavities in the mold structure 67a, including both the area of the cavities in the bricks being formed and also the area of the brick material surrounding the brick cavities.

Above the mold table 62 core members 139 are provided, there being a core member for each of the two cavities in each of the two bricks being formed in the particular embodiment illustrated. These core members are carried by a mounting structure 140 which is connected with the lower end of the piston rod 141 which extends downwardly out of the core actuating cylinder 142, mounted on a frame part 143. The upper high pressure cylinder 144, mounted on framing at 145, has a piston with a piston rod 146 which is hollow, the iston rod 141 being extended through the piston rod 146, as clearly appears.

The hollow piston rod 146 carries a structure 147 at its lower end to which the various part of the high compression press elements 148 are connected. These press elements being arranged in a pattern conforming with the cross section of the hollow bricks themselves, as appears in FIGS. 27 and 29.

In FIG. 23 the cores 139 and the piston elements 84a and 148 are shown positoned slightly above and below the upper and lower ends of the mold structure carried by the turntable 62, and this position of the parts represents the position as the mold structure is carried by the turntable from the precompression station A to the high compression station B.

In FIG. 24 the cores have been advanced downwardly into the cavities in the precompressed bricks, and the lower and upper press elements 84a and 148 have been advanced just to the point of engagement with the bricks in the mold structure.

In FIG. 25 the lower press element 84a has advanced upwardly somewhat, the cores 139 being correspondingly shifted upwardly, and the upper press structure has advanced downwardly into the mold structure, thereby effecting the final and high compression of the bricks.

Thereafter, as will be understood, the upper press structure and the cores will be withdrawn upwardly and the lower press structure will be withdrawn downwardly, so that when the turntable carries the mold to the ejection station C, the bricks may be ejected in the same general manner as described above in connection with FIGS. 2 to 10.

With regard to the arrangement of the parts in FIGS. 23 to 29, it is pointed out that the use of coaxial cylinders with telescoping piston rods, for actuating cores and press elements may be employed, if desired, for precompression at station A, in which event these coaxial cylinders would be positioned below the turntable, instead of above the turntable. However, it is preferred to use the core and press element actuating arrangement of FIGS. 2 to 10 at the precompression station, because the coaxial disposition of the cylinders necessitates a greater vertical height to accommodate the actuating cylinders, and for most installations it is preferred not to elevate the turntable sufficiently above normal ground or floor level to accommodate the coaxial cylinder arrangement. At the high compression station, however, since the cooperating core and press element cylinders may be arranged above the turntable, it is preferred to employ the coaxial arrangement, and it will be noted that such coaxial arrangement, with the cylinders above the turntable, does not require undue elevation of the turntable. The coaxial arrangement also has istinctive advantages in that it provides symmetry of distribution of forces incident to operation of the core and press cylinders, and this is particularly important at station B, because this is the high compression station in which the highest press forces are generated.

With respect to all embodiments and especially to the embodiment of FIGS. 16 through 29, it is contemplated that some provision be made for vibration or for intermittent movement of press elements in small increments, in order to promote transfer of charges from the measuring devices into the molds, and also to enhance the uniformity of compression.

We claim:

1. A press for forming bricks from charges of particulate material, comprising a turntable, at least three brick molds each having openings at opposite sides and mounted on the turntable in angularly spaced relation about the axis of the turntable, and mechanism including reciprocable press elements in fixed locations spaced around the axis of the turntable and establishing a plurality of fixed operating stations including precompression, compression and ejection stations angularly spaced about the axis of the turntable and through which the molds are successively carried by movement of the turntable, the reciprocable press elements of the mechanism providing the precompression and compression stations each includes that a pair of movable press plungers mounted to engage the charge in each mold through the opposite side openings of the mold when each mold is in the respective precompression or compression station, separate power means for applying pressure to the precompression and compressoon plungers, the power means for the compression plungers providing for application of higher pressure than the power means for the precompression plungers, and the mechanism establishing the precompression station further including means providing for shift of the mean position of the charge in the mold concurrently with precompression.

2. A press as defined in claim 1 in which the means providing for precompression and shift of the mean position of the charge includes means for positioning the charge in alignment with one of the mold openings but at least in part outside of the mold, with the working faces of the precompression press plungers at opposite sides of the charge and with one of the plungers projecting through the mold cavity and having its working face lying substantially in the plane of said one opening, and means for concurrently moving both of the press plungers in the direction to shift the charge into the mold, with said one plunger moving at a lower rate than the other plunger to thereby effect said shift concurrently with said precompression.

3. A press as defined in claim 1 and further including means for delivering a charge of particulate material to the mold in the precompression station prior to precompression of the charge by the pair of precompression press plungers.

4. A press for forming bricks from charges of particulate material, comprising a turntable, at least three brick molds each having openings at opposite sides and mounted on the turntable in angularly spaced relation about the axis of the turntable, mechanism including reciprocable press elements in fixed locations spaced around the axis of the turntable and establishing a plurality of fixed operating stations including precompression, compression and ejection stations angularly spaced about the axis of the turntable and through which the molds are successively carried by movement of the turntable and means for charging the molds including a feeder for the particulate material to be molded, a pair of charge measuring devices each having a chamber, the volume of which measures the charge to be used in forming the bricks, and support mechanism for said devices movably mounted to alternately bring the measuring chamber of each measuring device into cooperation with the feeder to receive the charge and with a mold to deliver the measured charge thereto.

5. A press as defined in claim 4 in which the support mechanism for the measuring devices comprises a turntable mounted for rotation about an axis parallel to the axis of the mold turntable and positioned to partially overlap the mold turntable, the measuring devices being mounted to register with the molds when positioned in one of the operating stations.

6. A press for forming bricks from charges of particulate material, comprising a turntable, at least three brick molds each having openings at opposite sides and mounted on the turntable in angularly spaced relation about the axis of the turntable, mechanism establishing a plurality of press operating stations at fixed angularly spaced positions about the axis of the turntable and through which the molds are successively carried by movement of the turntable, one of said stations comprising a mold loading station, two successive stations having pairs of press plungers providing for compression of the charges in the molds in two successive stages, separate power means for applying pressure to the pairs of press plungers of said two successive stations, the power means for the press plungers of the second of said two compression stations providing for application of higher pressure than the power means for the plungers of the first of said two compression stations, and another station comprising an ejection station.

7. A press for forming bricks from charges of particulate material, comprising a turntable, at least three brick molds each having openings at opposite sides and mounted on the turntable in angularly spaced relation about the axis of the turntable, mechanism establishing a plurality of press operating stations at fixed angularly spaced position about the axis of the turntable and through which the molds are successively carried by movement of the turntable, there being a plurality of series of press operating stations each incorporating at least one high pressure compression station, with the high pressure compression stations spaced about the axis of the turntable at equal angles from each other and each series of press operating stations further including a single station providing for both mold charging and precompression of the mold charges, with the charging-precompression stations also spaced about the axis of the turntable at equal angles from each other.

8. A press as defined in claim 7 in which the turntable carries a number of molds equal to the number of operating stations, with molds and operating stations both spaced at equal angles to each other about the axis of the turntable.

9. A press for forming bricks from charges of particulate material, comprising a turntable, at least three bricks molds each having openings at opposite sides and mouhted on the turntable in angularly spaced relation about the axis of the turntable, mechanism including reciprocable press elements in fixed locations spaced around the axis of the turntable and establishing a plurality of fixed operating stations including precompression, compression and ejection stations angularly spaced about the axis of the turntable and through which the molds are successively carried by movement of the turntable, each mold having a plurality of mold cavities and the ejection station having a multi-pronged press element with a prong positioned to enter each mold cavity of the mold in the ejection station and with the prongs graduated in length to provide for sequential ejection of bricks from different mold cavities.

10. Equipment for use in making bricks from particulate material, comprising a turntable, at least three brick molds mounted on the turntable in angularly spaced relation about the aixs of the turntable, mechanism establishing a plurality of press operating stations at fixed angularly spaced positions about the axis of the turntable and through which the molds are successively carried by movement of the turntable, at least one of said stations including means providing for compression of a charge of particulate material, and mechanism for delivering charges of particulate material to the molds to be compressed therein, the delivery mechanism comprising charge measuring devices and a secondary turntable carrying the measuring devices to a station overlying one of the mold press operating stations to provide for delivery of charges to the molds in that station, and to a station offset beyond the periphery of the mold turntable, and means at said offset station for charging the measuring devices.

11. Equipment as defined in claim 10 and further including means for adjusting the volume of the charge measuring devices.

12. Equipment for use in making bricks from particulate material, comprising a turntable, at least three brick molds mounted on the turntable in angularly spaced relation about the axis of the turntable, mechanism establishing a plurality of press operating stations at fixed angularly spaced positions about the axis of the turntable and through which the molds are successively carried by movement of the turntable, at least one of said stations including means providing for compression of a charge of particulate material, and mechanism for delivering charges of particulate material to the molds to be compressed therein, the delivering mechanism comprising a particulate material feeder positioned at a station offset beyond the periphery of the mold turntable, a plurality of devices having charge carrying chambers for receiving measured charges from the feeder, each carrying chamber having openings at opposite sides positioned to register respectively and alternately with the feeder and with a mold on the turntable, the means for effecting compression of the charges in the molds including a press plunger adapted to enter the mold through the carrying chamber, and means mounting the carrying devices for movement between the offset feeder station and a station in registry with said compression station and providing for transfer of charges of particulate material from the feeder to the molds.

13. Equipment for use in making building bricks from moist mineral material, comprising means for drying said material comprising means for circulating heating air in contact with the material and for separating moisture laden air from the material, grinding means for the dried material, means for mixing water and binder with the dried and ground material to provide a free flowing particulate mass, mechanism having a plurality of operating stations and including mold transport means having a plurality of mold positions with at least one brick mold in each position and means for actuating the transport means to stepwise and sequentially advance the molds in each position into registry with the several operating stations, mechanism for sequentially feeding batches of said free flowing particulate mass into the molds as they register with a first station, mechanism at another station for compressing the batches of the particulate mass in the molds and providing for compression of the batches sufficiently to form bricks capable of withstanding unconfined handling and transport, an enclosure for defining a moisture saturated curing chamber, ejection means for stripping the compressed bricks from the molds, conveyor means for receiving the bricks as they are ejected and for transporting the ejected bricks into the curing chamber prior to any appreciable dehydration of the bricks, and means for circulating moisture laden air from the drying means to the curing chamber.

14. A press for forming bricks from charges of particulate material, comprising a turntable, at least three brick molds each having a mold cavity with openings at opposite sides and mounted on the turntable in angularly spaced relation about the axis of the turntable, mechanism including reciprocable press elements in fixed locations spaced around the axis of the turntable and establishing a plurality of fixed operating stations including precompression, compression and ejection stations angularly spaced about the axis of the turntable and through which the molds are successively carried by movement of the turntable, means for charging the molds including a feeder for the particulate material to be molded, a charge carrying device, support mechanism for said device movably mounted to alternately bring the carrying device into cooperation with the feeder and with a mold in the precompression station, the charge carrying device having a chamber for receiving a measured charge and the chamber being of the same cross sectional shape as the mold cavity and with openings at opposite sides, the charge being delivered from the feeder through one of said openings into the carrying chamber when the support mechanism is moved to bring said device into cooperation with the feeder, and means for closing the other opening of said chamber during delivery of the charge from the feeder into said chamber and during movement of the support mechanism to bring said chamber into cooperation with the mold in the precompression station; the mechanism for establishing the precompression station including a pair of press plungers mounted to register with the mold cavity and one of said pair of plungers being mounted to enter the charge carrying chamber through one of its openings and to transfer the measured charge from said chamber into the mold cavity.

15. A press as defined in claim 14 in which the carrying device comprises relatively movable telescopic parts defining the carrying chamber and means for varying the volume of the chamber comprising means for adjusting the relative positions of said telescopic parts.

16. A press as defined in claim 14 in which the mounting means for the pair of precompression press plungers includes means for providing for entry of one of the press plungers into the mold cavity through the opening thereof opposite to the opening through which the charge is received, and means providing for positioning of said one press plunger with the working face thereof lying substantially in the plane of the mold opening through which the charge is received when the carrying device is positioned in registry with the mold in the precompression station, and means for concurrently moving both of the press plungers in the direction to shift the charge from the cavity in the carrying device into the mold cavity, with said one plunger moving at a lower rate than the other plunger to thereby effect said precompression during transfer of the charge from the cavity in the carrying device into the mold cavity.

17. Equipment for use in making bricks from particulate material, comprising a turntable, a plurality of brick molds each having a brick molding cavity with openings at opposite sides thereof, the molds being mounted on the turntable in angularly spaced relation about the axis of the turntable, mechanism establishing a plurality of press operating stations at fixed angularly spaced positions about the axis of the turntable and through which the molds are successively carried by movement of the turntable, said stations including at least one mold filling station and at least one compression station, mechanism for delivering charges of particulate material to the molds in the mold filling station, the delivering mechanism comprising a particulate material feeder offset from said filling station, a charge carrying device having a cavity of substantially the same cross section as that of the mold cavity and having openings at opposite sides, means mounting the carrying device for movement between a position with one opening of its cavity in registry with the offset feeder station to receive a charge of the particulate material and a position in which the other opening of its cavity is in registry with a mold in the mold filling station, in which latter position the cavity in the charge carrying device and the mold cavity communicate with each other and form a common chamber, means for closing said other opening of the cavity in the charge carrying device when the carrying device is receiving a charge of the particulate material and when the charge carrying device is being moved from the offset feeder station into registry with the mold in the mold filling station, and a pair of press plungers at said mold filling station positioned to enter opposite ends of said common chamber and effect compression of the charge therein.

18. Equipment as defined in claim 17 in which the mechanism establishing the press operating stations further includes a pair of press plungers positioned to enter the molds at said compression station and providing for application of higher compression force than that applied by the press plungers positioned at the filling station.

19. Equipment as defined in claim 18 in which the press plungers positioned at the filling station shift the mean position of the charge into the mold cavity concurrently with application of the compression force to the charge.

20. Equipment as defined in claim 17 in which the mechanism for delivering charges of particulate material to the molds includes a pair of charge carrying devices alternately movable into registry with the feeder and with the molds in the filling station.

21. Equipment as defined in claim 17 in which the cavity in the charge carrying device is substantially larger than the mold cavity and carries a charge of particulate material of greater volume than the mold cavity, and in which the pair of plungers at the mold filling station compress the charge to a volume not greater than that of the mold cavity.

22. A press as defined in claim 14 wherein at least one of said press operating stations includes at least one core element movable into a mold at said one station to define a cavity in the brick to be made, and in which said press elements are hollow and provide for compression of a charge of particulate material in the interspace between the mold wall and the core element.

23. A press as defined in claim 22 and further including separate hydraulic devices for effecting movements of the core and press elements with respect to a mold in said one station.

* * * * *